United States Patent [19]

Korsmeyer

[11] Patent Number: 5,105,689
[45] Date of Patent: Apr. 21, 1992

[54] CONTROL APPARATUS OF AN INTERNAL COMBUSTION ENGINE COMPRISING A HYDROSTATIC TRANSMISSION GEARING

[76] Inventor: Julius Korsmeyer, Galileistrasse 69, D-4970 Bad Oeynhausen, Fed. Rep. of Germany

[21] Appl. No.: 626,758

[22] Filed: Dec. 13, 1990

[51] Int. Cl.⁵ .............................................. F16H 59/06
[52] U.S. Cl. ......................................... 74/876; 74/482
[58] Field of Search ..................... 74/482, 875, 876; 192/0.096

[56] References Cited

U.S. PATENT DOCUMENTS

| 3,204,732 | 9/1965 | Morse | 74/876 X |
|---|---|---|---|
| 3,444,765 | 5/1969 | DesChamps | 74/876 |
| 4,034,835 | 7/1977 | Baba | 74/876 X |
| 4,232,771 | 11/1980 | Prince | 74/876 X |
| 4,321,980 | 3/1982 | Nissen | 180/333 |
| 4,512,451 | 4/1985 | Kobelt | 192/0.096 |
| 4,553,626 | 11/1985 | Kazmierczak et al. | 74/482 X |

Primary Examiner—Dirk Wright
Attorney, Agent, or Firm—Knobbe, Martens, Olson & Bear

[57] ABSTRACT

A gas pedal is connected by levers, cables and rods to start the engine and control fuel flow, and simultaneously control a transmission. The transmission is in turn connected by cables to a "forward and reverse" lever.

10 Claims, 4 Drawing Sheets

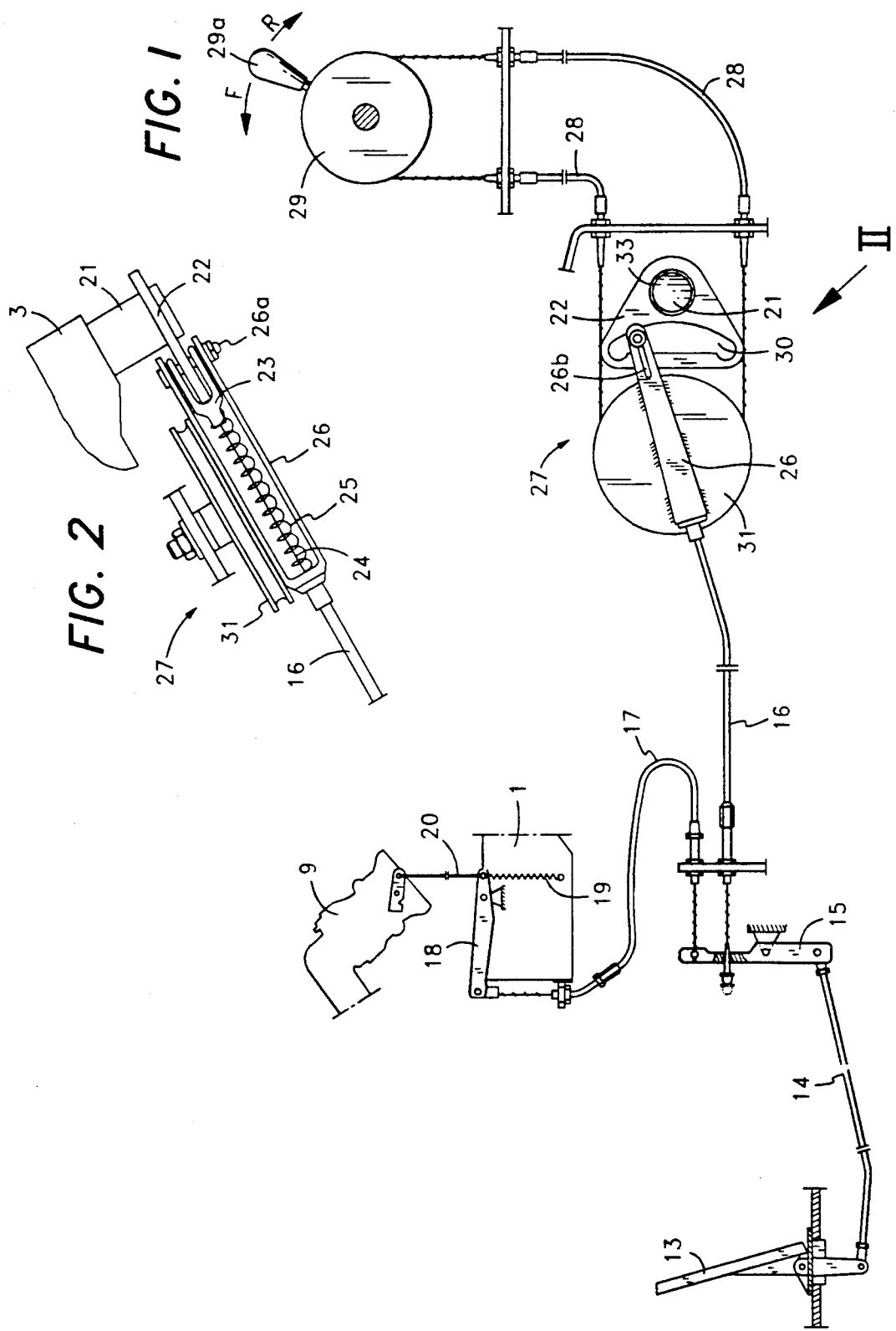

CONTROL APPARATUS OF AN INTERNAL COMBUSTION ENGINE COMPRISING A HYDROSTATIC TRANSMISSION GEARING

TECHNICAL FIELD

This invention relates to a control apparatus for an internal combustion engine comprising a hydrostatic transmission gearing coupled therewith, which apparatus is above all suited for special vehicles which are e.g. used for transporting golf equipment and golf players (so-called golf carts), for floor sweeping machines and for other vehicles of a low speed of travel. This control apparatus is equipped with cooperating levers, pull rods, roller levers and Bowden cables in a manner which is known per se.

BACKGROUND ART

In the generally known special vehicles, such as golf carts, the drive box has a limited volume which is defined by the vehicle contour.

Depending on the respective drive source, storage battery sets are mounted in the drive box with an electric motor. These sets are coupled with the gearbox in the vehicle drive axle.

In the more recent prior art of golf carts, the internal combustion engine is directly coupled with the hydrostatic transmission to a direct individual drive whose torque is then transmitted to the rigid semishafts of the drive wheels.

The control systems for drive units and drive transmissions as are known from U.S. Pat. Nos. 4,321,980 and 4,512,451 work according to the principle of connected and cooperating displacement rods. These include one-armed and two-armed levers, pull rods, rotational cam elements and Bowden cables.

The control systems simultaneously act on the internal combustion engine—rotational function—and on the hydrostatic transmission gearing—function of a specific medium flow into the liquid engines. There exist control possibilities for "forward travel and reverse travel". The known control systems require thorough maintenance work and are susceptible to jamming, above all the pull rods, under difficult conditions of use, such as dust or sand.

It is the object of the present invention to provide a control apparatus for an engine and a hydrostatic transmission gearing which is coupled with the engine and can be relied on even under difficult conditions of use, and where the same operational movements can be observed as in the case of electrically driven golf carts.

DISCLOSURE OF THE INVENTION

With a control apparatus of the above-mentioned type, this object is attained in that a gas pedal and a control lever have disposed thereinbetween a control device which acts on the hydrostatic transmission gearing and is equipped with a lever means arranged between the ends of the Bowden cables extending from the gas pedal on the one hand and from the control lever on the other hand and which is provided with a one-armed lever which moves the control pin of the transmission gearing and whose curve-shaped guide surfaces guide a resiliently mounted guide pin which is movably supported on a roller lever.

In a preferred embodiment the end piece of the Bowden cable is slidingly inserted together with a driver in a guide mounted on the roller lever and performs a radial movement along the radius relative to the pivot point of the roller lever which is connected to the control roller by means of Bowden cables. The roller of the driver is connected to a one-armed lever (rocker) through a cam hole symmetrically designed in the lever, which consists of a slide curvature and an auxiliary curvature defined by an arc of a radius corresponding to that of the work seat. The one-armed lever is mounted on the control pin of the hydrostatic transmission gearing.

The driver which is inserted in the guide forms a kinematic pair together with the one-armed lever. The second end of the Bowden cable which is secured to the guide is connected to the arm of the two-armed lever which in turn is connected to a Bowden cable. This Bowden cable controls the carburetor of the internal combustion engine which drives the hydrostatic transmission gearing.

In another preferred embodiment of the invention, the guide pin is supported on a lever of a roller firmly connected thereto and is acted upon by a tension spring which is connected to the end of the Bowden cable leading to the gas pedal.

An embodiment of the invention will be described below in more detail with reference to the accompanying drawing in which FIG. 1 is a diagrammatic general view of a control apparatus;

FIG. 2 is a partial view of the same control apparatus in accordance with arrow direction II in FIG. 1;

Figure 3:
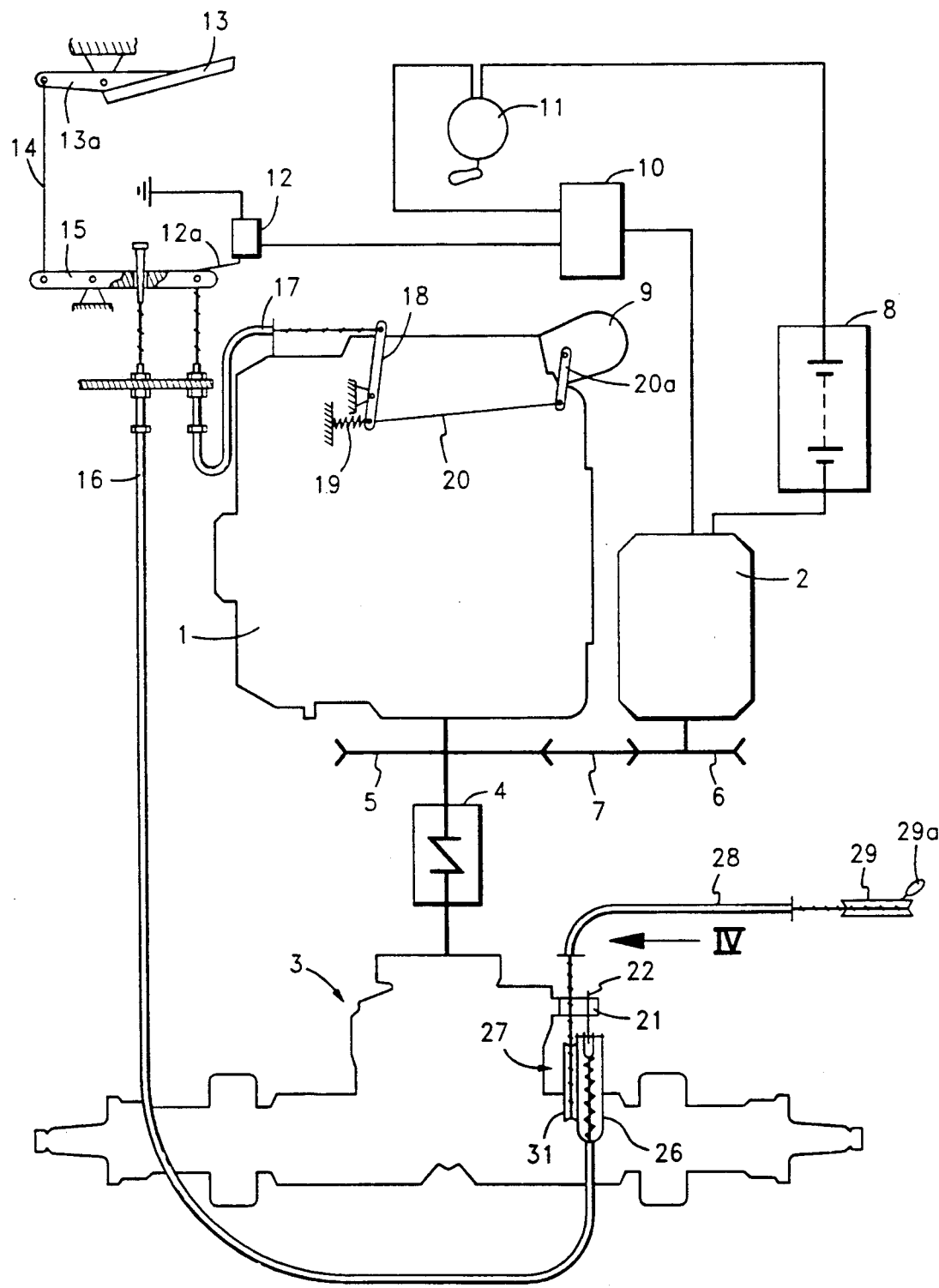
FIG. 3 is a diagrammatic view of the control apparatus for an internal combustion engine and a hydrostatic transmission gearing.
Figure 4:
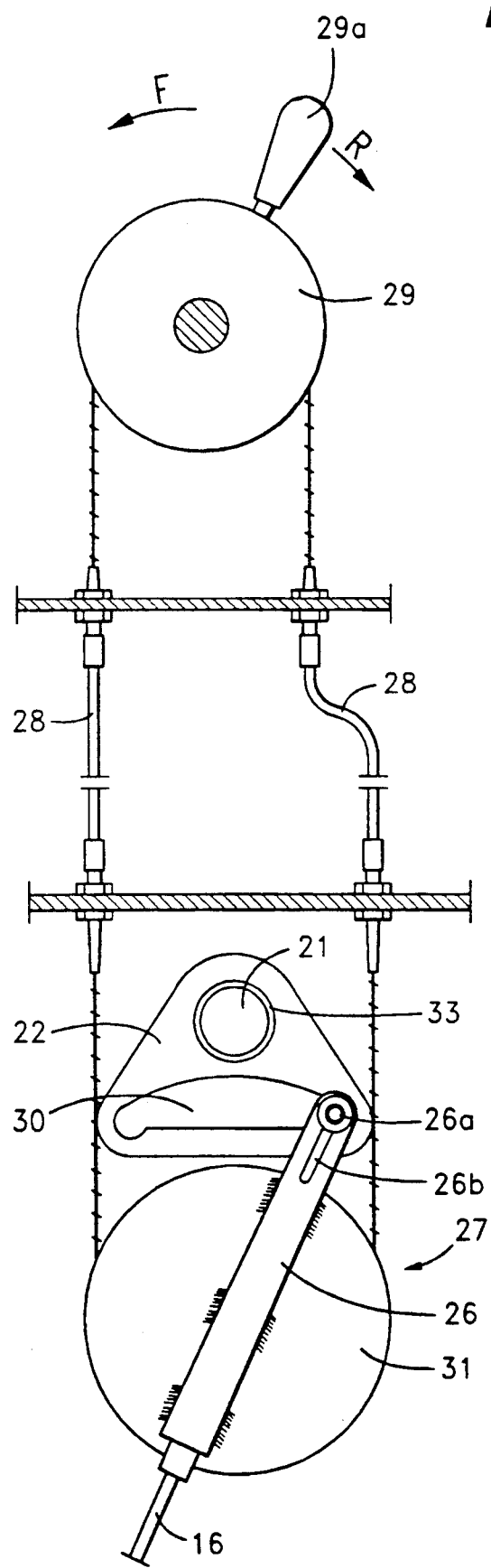
FIG. 4 is a partial view of the control scheme in accordance with arrow direction IV in FIG. 3.
Figure 5:
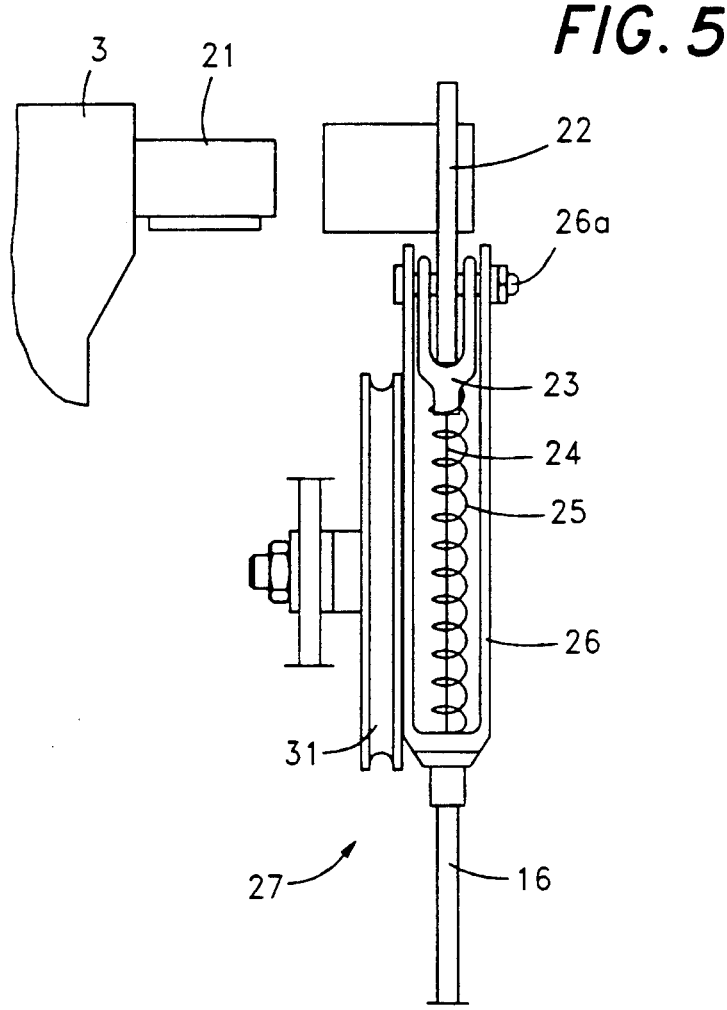
FIG. 5 is a view of enlarged scale in comparison with FIG. 2, showing the connection of a driver to a one-armed lever, but now separated from the hydrostatic transmission gearing.
Figure 6:
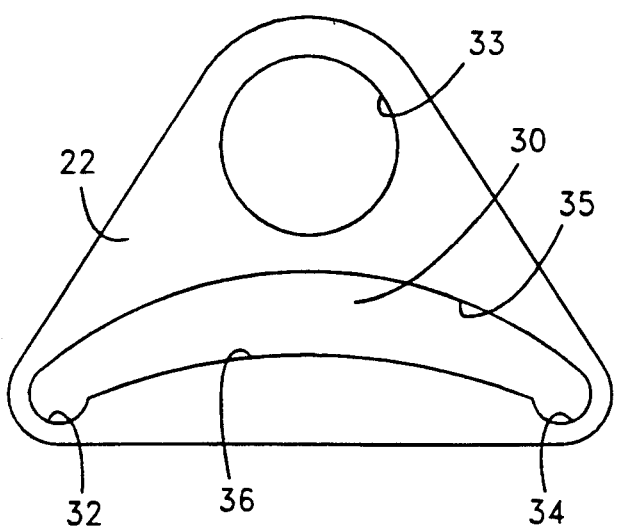
FIG. 6 is a view of enlarged scale in comparison with FIGS. 1 and 4, showing the one-armed lever to be attached to a control pin of the hydrostatic transmission gearing.

An internal combustion engine (1) is connected to a hydrostatic transmission gearing (3) via a flexible coupling, with a grooved wheel (5) being mounted on a shaft of the internal combustion engine (1) and connected via a V-belt (7) to the grooved wheel (6) mounted on the shaft of the starter generator (2).

The operation of the starter generator (2) is controlled by a control device (10) which supplies voltage from a storage battery (8) to the starter generator (2) via a current switch (11) and a microswitch (12) which is controlled by a two-armed lever (15) having a fixed pivot point (15a).

The two-armed lever (15) is actuable (movable) by a gas pedal (13) via a pull rod (14). The longer arm of said two-armed lever (15) is provided with the following members:

1. A Bowden cable (17) is connected to the end of the lever. The end of the Bowden cable (17) abuts on a lever (18) which is acted upon by a spring (19) and coupled to a pull rod (20) which controls the lever of the carburetor (9) of the internal combustion engine (1).

2. A Bowden cable (16) abuts against the center of the lever and controls the hydrostatic transmission gearing (3).

The sheath of the Bowden cable (16) is supported from the outside on a guide holder (26), the end (24) of the Bowden cable (16) being surrounded by a tension spring which is supported in the seat of the guide holder (26) and on the cylindrical part of a driver (23) to which the cable end (24) is secured.

A one-armed lever (22) which is shaped in the form of a triangular rocker is mounted on a control pin (21) which rotates about an invariable axis and pertains to the hydrostatic transmission gearing (3). This lever (22) is displaceably connected to a roller lever (27) via a recess (30) having about the shape of a circular arc and via the driver (23). The guide holder (26) is fixedly connected to the roller lever (27) which can perform a rotational movement and is connected by means of Bowden cables (28) to a control roller (29) comprising a handle (29a); the axial distance of the control roller (29) from a rotary roller (31) is invariable. A pin (26a), or a screw or the like, is inserted through the two free leg ends of the approximately U-shaped guide holder (26). On the one hand, this pin (26a) passes through the two free ends of the approximately U-shaped driver (23) arranged between the spaced and opposite legs of the pivotable guide holder (26) and extends, on the other hand, through the one-armed triangular lever (22) disposed between the two spaced and opposite legs of the driver (23). The recesses which are provided in the guide holder (26) and penetrated by the pin (26a) are formed as elongate slots (26b) extending in the longitudinal direction thereof.

The longitudinal axis of the pin (26a) is in parallel with the imaginary longitudinal axis of the cam hole (33).

The control of the apparatus is limited to the actuation of the current switch (11)—the internal combustion engine (1) still remains in the inoperative state—and to the following activities during forward movement:

a) The handle of the control roller (29) is moved up to the abutment (stop) in direction F—forward movement; the rotary roller (31) of the roller lever (27) rotates during this operation. After termination of this rotary movement the pin (26a) which passes through the driver (23) is positioned in the work seat (32) of the recess (30) as a cam. Hence, the driver (23) is fixed in the area of the work seat (32) and has somewhat rotated in one-armed lever and thus the control pin (21) as well.

b) The gas pedal (13) is smoothly and continuously depressed. In the first pressure phase the microswitch (12) becomes operative and actuates the control device (10); the starter generator (2) simultaneously starts the internal combustion engine (1) which then operates at idle speed, with the starter generator (2) charging the storage battery (8) via the control device (10).

c) In the second pressure phase of the gas pedal (13) the Bowden cable (17) which controls the carburetor (9) increases the rotational speed of the internal combustion engine until the maximum rotational speed is reached. The Bowden cable (16) simultaneously effects a rotational movement of the driver (23) and also a pivotal movement of the one-armed triangular lever (22) together with the control pin (21) of the hydrostatic transmission gearing (3) until a maximum medium flow is obtained.

d) Braking of the vehicle—the internal combustion engine (1) stops and a renewed forward movement requires the exertion of a smooth and continuous pressure on the gas pedal (13).

By contrast, the following activities are required for a reverse movement:

e) The handle of the control roller (29) is moved up to the abutment (stop) in direction R—reverse movement. Thereupon the driver (23) rotates in the opposite direction and is positioned in the area of the work seat (34) of the recess (30) of the one-armed lever (22).

f) Smooth and continuous depression of the gas pedal (13) as with the forward movement.

I claim:

1. A control apparatus for an internal combustion engine and a hydrostatic transmission gearing coupled therewith, which apparatus is equipped with interconnected and cooperating two-armed lever (15), pull rod (14), roller lever (27), one-armed lever (22) and Bowden cables (16, 17, 28), characterized in that a gas pedal (13) and a control lever (29) have disposed therein between a control device which acts on said hydrostatic transmission gearing (3) and is equipped with a lever means (31, 26, 22) arranged between the ends of the Bowden cables extending from said gas pedal (13) on the one hand and from said control lever on the other hand, said lever means including a one-armed lever (22) which moves the control pin (21) of said transmission gearing (3) and whose curve-shaped guide surfaces (35, 36) guide a resiliently mounted guide pin (26a) which is movably supported on a roller lever (31).

2. A control apparatus as defined in claim 1, characterized in that said one-armed lever (22) firmly surrounds a control pin (21) of said hydrostatic transmission (3) with its cam hole (33) and a bent guide surface is formed at one side as a cam having a slide curvature (35) and an auxiliary curvature (36) which are alternatively engaged by said guide pin (26a).

3. A control apparatus as defined in claim 1, characterized in that said lever means includes a lever (26) of a roller (31) supporting said guide pin (26a) and said guide pin and being acted upon by a tension spring (25) connected to the end of said Bowden cable (16) leading to said gas pedal (13).

4. A control apparatus as defined in claim 3, characterized in that said roller (31) is surrounded by a Bowden cable (28) which enclosed a control roller (29) at the other end.

5. A control apparatus as defined in claim 1, characterized in that the axis of rotation of a driver (23) and a longitudinal axis of said control pin (21) are in a common plane which is congruent with the plane of the neutral position of said control pin (21), whereas one end of a Bowden cable (16) is connected to said driver and the second end of the Bowden cable (16) is connected to the arm of a two-armed lever (15) against which the end of the Bowden cable (17) abuts, said second end of said Bowden cable (17) being connected to a two-armed lever (18) which controls the lever of said carburetor (9) of said engine (1) via a pull rod (20).

6. A control apparatus as defined in claim 1, characterized in that said one-armed lever (22) comprises a symmetrical cam recess (30) having said guide surfaces forming a slide curvature (35) and an auxiliary curvature (35), both of said curvatures (35, 36) being connected by an arc of a radius forming the extreme work seats (32) and (34) of said recess.

7. A control apparatus as defined in claim 6, characterized in that said slide curvature (35) is a radius function of the rotational movement of the roller seated on said driver (23).

8. A control apparatus as defined in claim 1, characterized in that said lever means includes a guide holder (26), connected to said roller lever (27), supporting a driver (23), the longitudinal axis of the cable end (24) of one of said cables passing together with the longitudinal axis of said guide holder (26) through the pivot point of said roller lever (27) which is connected to said control lever (29) via a second one of said Bowden cables (28).

9. A control apparatus as defined in claim 1, characterized in that said one-armed lever (22) is formed as a triangular rocker and equipped with a bent recess (30) having end seats (32, 34) in which said pin (26a) is alternately seated.

10. A control apparatus as defined in claim 1, characterized in that the longitudinal axis of said pin (26a) and a cam hole (33) in said lever (22) are in parallel with each other.

* * * * *